United States Patent [19]

Giles, III

[11] 4,246,520

[45] Jan. 20, 1981

[54] MOTOR CONTROL AND REVERSING CIRCUIT

[75] Inventor: John T. Giles, III, Kenosha, Wis.

[73] Assignee: Cherry Electrical Products Corp., Waukegan, Ill.

[21] Appl. No.: 77,751

[22] Filed: Sep. 21, 1979

[51] Int. Cl.³ .............................................. H02P 1/22
[52] U.S. Cl. .................................... 318/280; 318/286; 361/167
[58] Field of Search ............... 318/280, 290, 286, 283; 361/139, 155, 156, 159, 160, 166, 167, 190, 191

[56] References Cited

U.S. PATENT DOCUMENTS

| 3,158,791 | 11/1964 | Deneen, Jr. et al. | 361/167 X |
| 4,159,173 | 6/1979 | Kasuga | 361/167 X |

*Primary Examiner*—Ulysses Weldon
*Attorney, Agent, or Firm*—Edward C. Threedy

[57] ABSTRACT

A motor energizing control and reversing circuit designed to be used on a power seat control in vehicles. The circuit includes a reversible motor that primarily drives suitable gear trains which effect seat movement in a plurality of directions and then momentarily reverses the motor so as to apply moving power to the gear train in an opposite direction to relieve pressure thereon and prevent a locked rotor condition in which the seat could not be moved.

6 Claims, 1 Drawing Figure

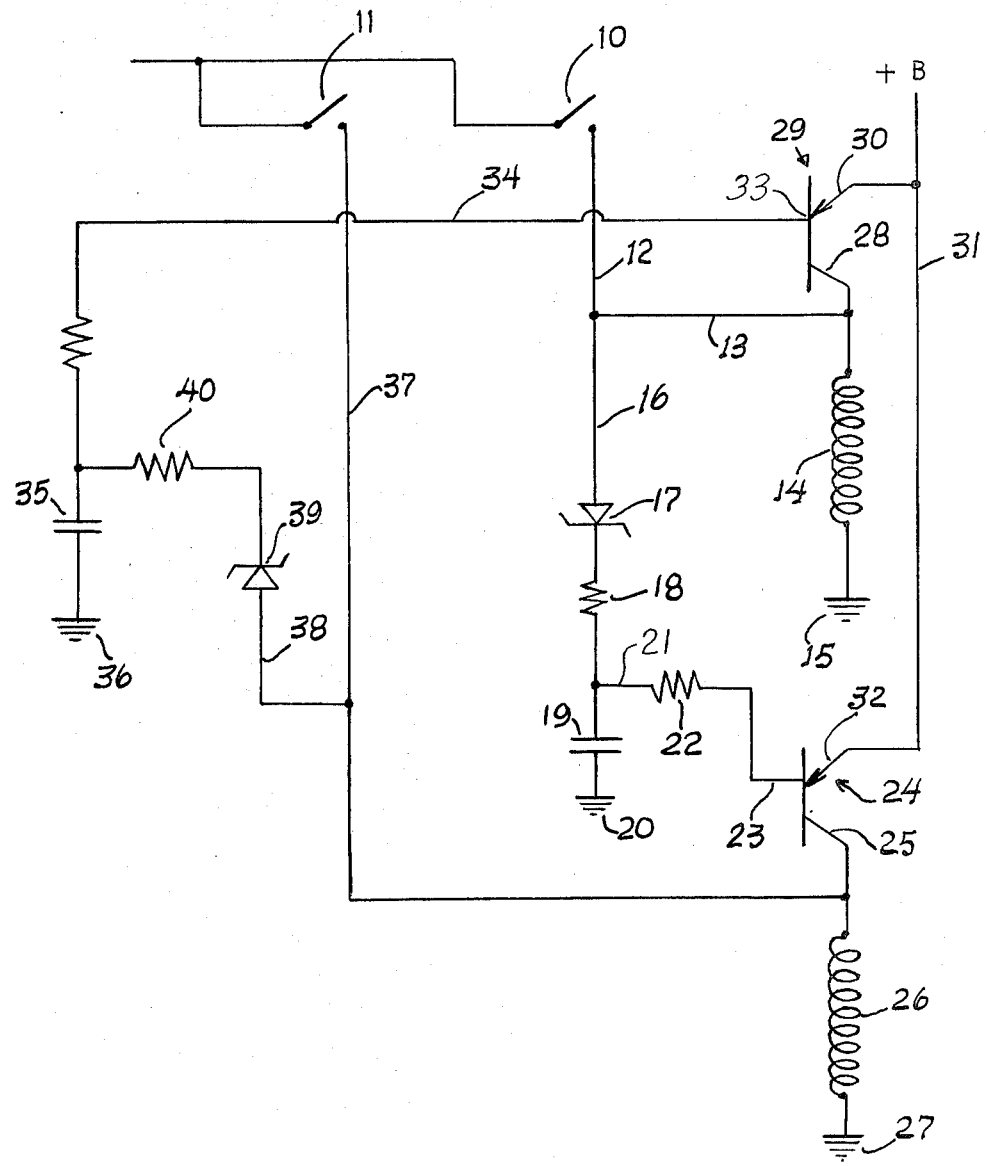

MOTOR CONTROL AND REVERSING CIRCUIT

SUMMARY OF THE INVENTION

In prior power circuitries of this nature operating at low current levels there is required a series of power transistors to handle a plurality of control solenoids and relays. The circuit is elaborate and costly.

The present invention utilizes as the major control the switch contacts with a short reversing power circuit obtained from a charged capacitor. The theory of operation of the present circuit is to utilize the inductive energy developed in the initial operated relay coil to charge a capacitor, which in turn will momentarily drive a transistor, which in turn effects energization of an opposite relay coil.

In the present invention when any directional control switch; i.e., seat up or seat down is closed, a capacitor connected in circuit with such switch is discharged simultaneously with the energization of an "up" relay coil which through appropriate relay switches controls the energization of the reversible motor. When the "up" switch is released, the stored inductive energy is released to charge the capacitor, which in turn is used to drive a transistor that in turn momentarily energizes the opposite motor direction relay coil (down relay coil). The circuit includes Zener diodes, which prevent driving the transistors when the same are in a standby or inactive condition.

GENERAL DESCRIPTION

The invention will be best understood by reference to the accompanying drawing in which:

FIG. 1 is a schematic diagram of the circuitry of the present invention.

While the following description of the present invention makes specific reference to two manually operated switches which, as indicated, are designed to effect an upward or downward movement of a driven member, it should be realized that a greater plurality of switches could be included which would result in a multitude of directional movements as desired.

The present invention is adaptable for use in controlling the movement of a power seat in a vehicle. The mechanism for actually moving the seat, which would include a series of gear trains as well as electrically controlled reversible motors, are not shown, but with the understanding that their operation and function is well known in the art such as is disclosed in U.S. Pat. No. 3,471,765.

The present invention, as shown in FIG. 1, includes a plurality of manually operable switches 10 and 11. The switch 10 by a conductor 12 and 13 is connected to a relay coil 14, which in turn is rounded as at 15. For an understanding of the operation of the circuit the relay coil 14 will be hereinafter referred to as the "up" relay. The switch 10 is also connected by a conductor 16, which includes a Zener diodes 17 and resistor 18 to a capacitor 19, which is grounded as at 20. From the conductor 16 there is a lead conductor 21 which includes a resistor 22 that is connected to the base 23 of a transistor 24.

As shown, the collector 25 of the transistor 24 is connected to a relay coil 26 which is grounded as at 27. The relay coil 26 will be hereinafter referred to as the "down" relay.

The up relay 14 is likewise connected to the collector 28 of a second transistor 29. The emitter 30 of the transistor 29 by a conductor 31 is connected to the emitter 32 of the transistor 24. The base 33 of the transistor 29 is by a conductor 34 connected to a capacitor 35 which in turn is grounded as at 36.

The switch 11 by a conductor 37 is connected to the down relay 26. It is also connected to the capacitor 35 by a connector 38 which includes a Zener diodes 39 and a resistor 40.

The operation of the heretofore-described circuitry is as follows: Say, for example, the operator wishes to energize the "up" relay coil 14. This is accomplished by closing the manually operated switch 10, which in turn immediately energizes the "up" relay coil 14. Simultaneously with this energization of the relay coil 14 the capacitor 19 connected in circuit to the switch 10 is discharged. When the switch 10 is released the stored inductive energy developed in the "up" relay coil 14 is released to charge the capacitor 19, which in turn will drive the transistor 24 effecting the momentary energization of the "down" relay coil 26. The same operation results upon the closing of the manually operated switch 11, which in turn energizes the "down" relay coil 26 and discharges the capacitor 55 associated therewith. On the opening of the switch 11 the stored inductive energy will drive the transistor 29 and momentarily energize the opposite directional circuit including the "up" relay coil 14.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described my invention what I claim as new and desire to protect by Letters Patent is:

1. An energizing and reversing circuit for directional control of a reversible motor comprising:
    (a) a pair of directional control means that determines the direction of operation of the reversible motor,
    (b) a circuit for each of said control means including manually operable switches for independently energizing each of said control means to determine the initial direction of operation of the reversible motor, and
    (c) means coupled through each of said circuits with said control means and responsive to the deenergization of the initially energized control means to reverse the direction of operation of the motor.

2. An energizing and reversing circuit as defined in claim 1 wherein said control means comprise a pair of relays.

3. An energizing and reversing circuit as defined in claim 1 wherein said means coupled to said control means comprises a transistor connected in each circuit of each of said control means and each said transistor is adapted to be driven by stored inductive energy from a deenergized initially energized control means so as to momentarily energize the other of said control means to reverse the directional operation of the motor.

4. An energizing and reversing circuit as defined in claim 2 wherein said means coupled to said relay means comprises a transistor connected in each circuit of each of said relay means and each said transistor is adapted to be driven by stored inductive energy from a deenergized initially energized relay means so as to momentarily energize the other of said relay means to reverse the directional operation of the motor.

5. An energizing and reversing circit as defined in claim 3 including a capacitor coupled to each said transistor in each of the circuits of each of said control means, with each capacitor adapted to be discharged by the initial energization of its control means and to be charged by the stored inductive energy from its control means when deenergized so as to momentarily energize the other of said control means through its coupled transistor to reverse the directional operation of the motor.

6. An energizing and reversing circuit as defined in claim 4 including a capacitor coupled to each said transistor in each of the circuits of each of said relays, with each capacitor adapted to be discharged by the initial energization of its relay and to be charged by the stored inductive energy from its relay when deenergized so as to momentarily energize the other of said relays through its coupled transistor to reverse the directional operation of the motor.

* * * * *